July 25, 1950  F. T. COFFEY, SR  2,516,678
MOTION-PICTURE VIEWER
Filed Feb. 3, 1948
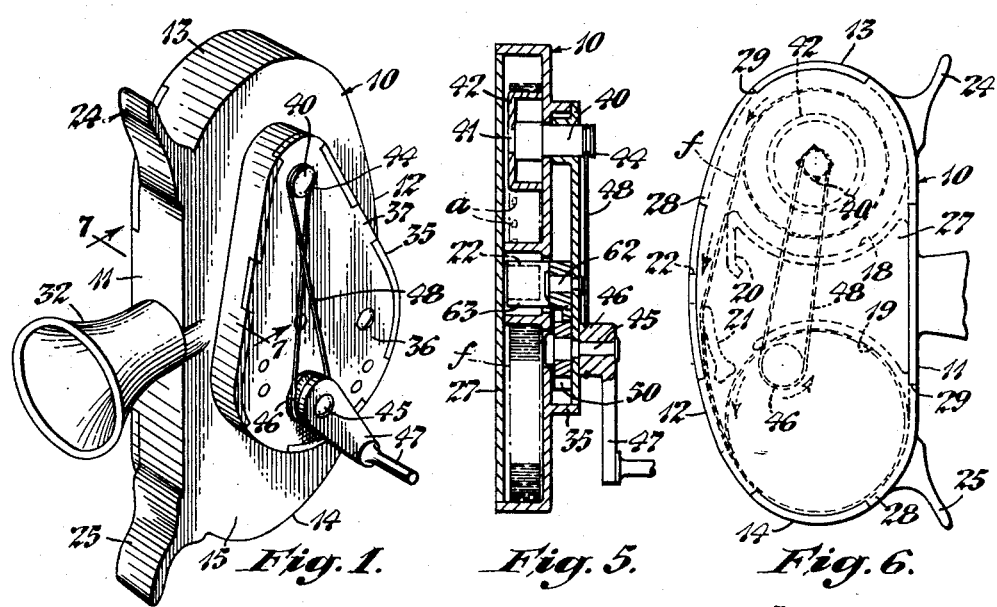
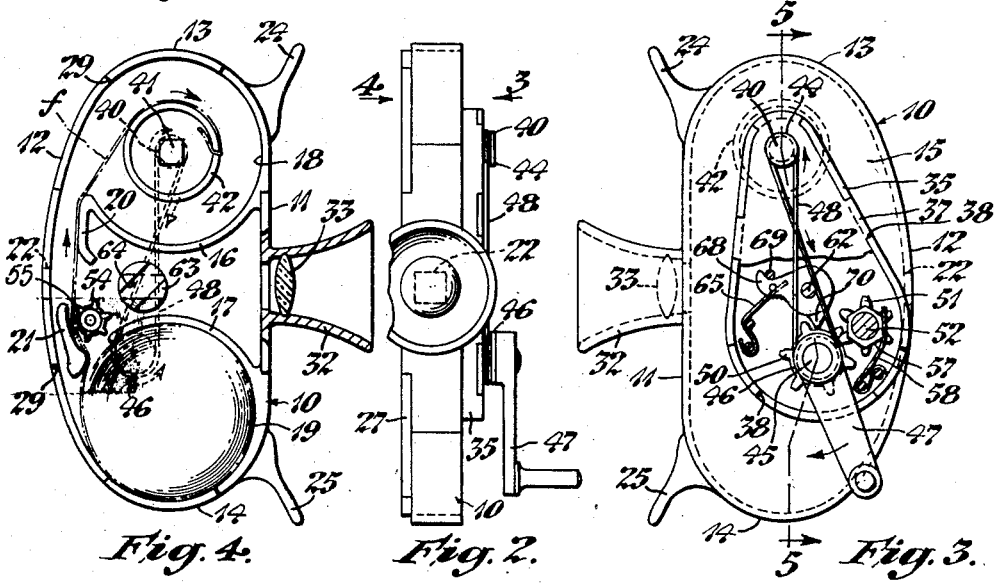
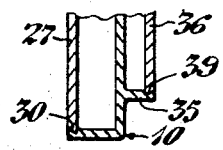
Inventor:
Francis T. Coffey, Sr.
By
William B. Hall
Attorney.

Patented July 25, 1950

2,516,678

UNITED STATES PATENT OFFICE 2,516,678

MOTION-PICTURE VIEWER

Francis T. Coffey, Sr., Los Angeles, Calif.

Application February 3, 1948, Serial No. 5,960

12 Claims. (Cl. 88—17)

My invention relates to devices for facilitating the viewing or inspection of transparent pictures, and particularly to a device intended primarily for effecting the convenient individual viewing of the pictures of a film strip with a "motion" effect, or observation of any of the pictures of the film as a "still" picture at the will of the operator. Specifically, the invention pertains to a viewer of relatively small size capable of being held in one hand of the user, and embodying means operated by the other hand for feeding a film past a lens through which the pictures are observed.

One object of my invention is to provide a viewer device which includes a casing having a light aperture, means for supporting a strip of film within the casing, feeding means for feeding the film strip past the aperture to permit light to pass through the film and to be viewed through a lens in the side of the casing, oscillatable shutter means for controlling the passage of light to the lens, and manually operable means for actuating the film feeding and shutter means in timed sequence so as to admit light only when the film strip is stationary.

Another object is to provide a device, of the character referred to, having a novel mechanism for actuating the operating elements, said mechanism being simple in construction and positive in operation.

Another important object is to provide a viewer in which the film strip is wound onto a spool during operation of the device, the invention further providing means for driving the spool from the manually operable means and embodying means for maintaining a slight pull on the film strip so as to take up the slack therein, to prevent buckling of the strip.

Another object is to provide a viewer of the type indicated in which the spool-driving means is reversible, so that the spool can either be rotated in a direction to wind up the film strip or in a reverse direction to cause the strip to unwind therefrom and be coiled up in the casing for removal from the device.

Another object is to provide a device, of the class referred to, which is especially simple in construction, light in weight, pleasing in appearance, economical to manufacture, and highly efficient in performing its intended function.

Further objects of the invention are set forth in the following description, which discloses a preferred construction of the viewer device, by way of example, as illustrated in the accompanying drawing. In the drawing:

Fig. 1 is a perspective view of a device constructed in accordance with my invention;

Fig. 2 is a front view of the device;

Fig. 3 is a side view of the device, as observed in the direction of the arrow 3 in Fig. 2;

Fig. 4 is a side view, as observed in the direction of the arrow 4 in Fig. 2;

Fig. 5 is a vertical sectional view, taken on line 5—5 of Fig. 3;

Fig. 6 is a view similar to Fig. 4, showing the driving means arranged to effect reverse rotation of the film spool; and, Fig. 7 is a fragmentary sectional view, taken on line 7—7 of Fig. 1.

Referring to the drawing in detail, my improved film-viewing device includes a casing 10 of traylike form having a straight front wall 11, a curved rear wall 12, arcuate top and bottom portions 13 and 14, and a planar side wall 15. Within the casing 10 are curved partitions 16 and 17, which provide upper and lower film receptacles 18 and 19. The upper partition 16 is extended downwardly adjacent the curved rear wall 12, to provide a guide 20 along which the film strip is adapted to slide in the manner to be later explained.

Below the guide 20 is a projection providing a second film guide 21. In the curved rear wall 12, between the guides 20 and 21, is a square light aperture 22 through which light can enter the casing 10 when the aperture is directed toward a source of light, for example, an electric lamp. At its top and bottom portions, the casing 10 is provided with curved fingerpieces 24 and 25 to adapt the device to be gripped between the forefinger and thumb of the operator of the device.

The open side of the casing 10 is adapted to be closed by a cover member 27 having the same outline as the casing and provided with projecting tongues 28 adapted to fit into grooves 29 in the casing to provide a smooth assembly. The perimeter of the cover member 27 is adapted to snap into an internal groove 30 in the casing, as shown in Fig. 7, to detachably secure these parts in connected relationship.

Mounted on or formed integral with the straight front wall 11 of the casing 10, in axial alignment with the light aperture 22, is a tubular element 32 in which a lens 33 is held. By this construction, when the film extends across the aperture 22, an enlarged image thereof can be observed through the lens 35.

Projecting from the flat side wall 15 is a flange which provides a substantially triangular housing 35 having curved upper and lower ends. The housing 35 is normally closed by a cover 36 having tongues 37 fitting into slots 38 in the flange 35 with its edge snapping into a recess 39, as shown in Fig. 7, to releasably retain the cover in position.

Rotatable in a bearing boss on the cover 36 is a spindle 40 which projects through a hole in the wall 15 of the casing 10 and has a square inner end 41. Adapted to be mounted on the square end 41 is a cup-shaped film spool 42 having a slit in its periphery through which an end of the film strip can be inserted to secure the film end to the spool. The other end of the spindle 40 projects laterally from the cover 36 and is formed with or otherwise provided with a grooved pulley 44. Rotatable in a hole in the cover 36 is a shaft 45 which carries a grooved pulley 46 on its outer projecting end, this pulley being a separate part or formed on the hub of an operating handle 47. A driving connection, such as a cord 48, extends around the pulleys 44 and 46, and during normal operation of the viewer the cord is crossed, as shown in Figs. 1 and 4, so that clockwise rotation of the handle 47, as seen in Fig. 3, causes counterclockwise rotation of the spindle 40 and spool 42 to wind the film strip f onto the spool.

Fast on the inner end of the shaft 45, within the housing 35, is a gear 50 having a series of widely spaced teeth adapted to engage the teeth of a smaller gear 51 rotatable on a stud 52 carried by the cover 36. Fast with the gear 51 is a small cog-wheel having small teeth, equal in number to the teeth of the gears 50 and 51. The wheel 54 constitutes the means for feeding the film strip f intermittently from the receptacle 19 to the spool 42 within the receptacle 18 past the light aperture 22 to permit the light to pass through the picture fed into alignment with the aperture, the teeth 55 being engageable in successive apertures a of the film f.

Adjacent the cover 35 the stud 52 has a polygonally-shaped cam element 57, the flat sides of which correspond in number to the teeth of the gear 51, and is adapted to be contacted by the end portion of a spring 58 held by a pair of pins on the inner side of the cover 36. The spring 58 functions as a detent to yieldingly retain the stud 52 and feeding wheel 54 stationary between intermittent rotations thereof and prevent retrogressive movement of the feeding wheel.

The viewer illustrated is designed to take a particular size of film. For a film of another size corresponding adjustment must be made in various operating parts.

Rotatable in a hole in the cover 36 is a short shaft 62 which carries a shutter element 63 extending through a hole in the wall 15 into the casing 10, the inner end of the element being provided with a slot 64 through which, when the element is rotated to one position wherein the slot aligns with the aperture 22 and lens 33, the picture disposed at the light aperture can be viewed through the lens. The shutter element 63 is, however, normally in the position shown in Fig. 4, that is, with its slot extending at an angle of approximately 45° to the line passing through the light aperture and lens so as to disrupt the passage of light to the lens. The element is retained in this position by means of a spring 65 held by pins and having its end engageable with a radial arm 68 of the element to maintain the arm resting against a pin 69 on the cover 36. The shutter element 63 is also formed with a pawl 70 adapted to be engaged by successive teeth of the gear 50, as the latter is rotated, so as to oscillate the shutter element and thus intermittently permit passage of light to the lens. The film-viewing device is operated in the following manner:

The cover member 27 is removed to permit insertion of a strip of film f into the casing 10, the strip being in the form of a coil which is placed in the lower receptacle 19. The end of the strip is drawn upwardly along the guides 20 and 21 and inserted in the slit of the film spool 42. The cover member 27 is then replaced and the viewer is ready for use in viewing the film f. The device is held in one hand of the operator and disposed adjacent the eye so that the operator can look into the element 32 and with the aperture 22 directed toward a source of light. The operator then turns the handle 47 in a clockwise direction, as shown in Figs. 1 and 3, to cause the gear 50 to index the gear 51 and feeding wheel 54, and thus feed the film strip through a distance equal to the space between pictures or frames of the film whereby to move a picture into register with the light aperture 22. At the same time, the pawl 70 is engaged by the tooth of the gear 50 and moved thereby to cause the shutter element 63 to move to the position indicated by the dash lines in Fig. 4 so as to permit observation of the picture. The observation is only momentary, however, because as the gear tooth rides out from under the pawl 70, the latter is returned to first position under the action of the spring 65.

During the cycle of operation explained above, the film spool 42 is rotated in clockwise direction, as shown in Fig. 4, so that the spool winds up the length of film advanced by the feeding wheel 54. It is to be particularly noted at this point that, due to the relative diameters of the pulleys 44 and 46, the tendency is for the spool to wind up a length of film greater than the length advanced by the wheel 54, and this condition is increased as the film wound on the spool increases in diameter. However, slippage can occur between the driving cord 48 and the pulleys 44 and 46 so that the spool is rotated only sufficiently to wind up the film advanced by the feeding wheel 54. By this provision, the film strip extending between the feeding wheel 54 and the spool is maintained taut to prevent buckling thereof.

The operation explained above is continued by merely rotating the handle 47 as long as the film lasts. After the entire film has been viewed, it is desirable to rewind the film into a coil for convenient removal from the device and storage. To rewind the film the cover member 27 is removed, the last wound end of the film retrieved and led downwardly, as shown in Fig. 6, into the receptacle, after which the cover member is again reassembled on the casing 10. The driving cord 48 is next uncrossed and caused to pass around the pulleys 44 and 46 in a straight loop, as shown in Fig. 6, so that rotation of the handle 47 now causes the spool 42 to rotate in counterclockwise direction, as viewed in Fig. 6, so as to pay out the film strip and force it downwardly into the receptacle 19 where it winds up, as shown in Fig. 4, into a coil adapted to be removed from the casing.

While I have herein shown and described the improved film viewer as embodied in a preferred form of construction, by way of example, it will be obvious that various modifications might be made in the structure without departing from the spirit of the invention. Therefore, without limiting myself in this respect, I claim:

1. In a film viewer, the combination of: a casing having a pair of recesses providing spaced film receptacles, said casing having an aperture in its side through which light can enter and a lens in its opposite side in axial alignment with said aperture, the first of said receptacles being adapted to contain a coil of picture film; a spool in the second of said receptacles; an intermittently rotatable film-feeding member engageable with said film for feeding the film from said first receptacle to said spool past said aperture, the spool and the film-feeding member being positioned on opposite sides of the axis of the lens and aperture; manually-operable means for intermittently rotating said feeding member, said means including a driven gear rotatable with said film-feeding member, a manually rotatable driving gear having widely spaced teeth each of which is adapted to engage a tooth of said driven gear to rotate the latter through a predetermined angular distance so as to cause said film-feeding member to feed the film through the distance of one frame; and a flexible driving connection between said manually-operable means and said spool for rotating the same, said driving connection tending to rotate said spool in a direction to maintain taut the length of film extending between said feeding member and said spool.

2. In a film viewer, the combination of: a casing having a pair of recesses providing spaced film receptacles, said casing having an aperture in its side through which light can enter and a lens in its opposite side in alignment with said aperture, the first of said receptacles being adapted to contain a coil of picture film; a spool in the second of said receptacles; an intermittently rotatable film-feeding member engageable with said film for feeding the film from said first receptacle to said spool past said aperture; manually-operable means for intermittently rotating said feeding member, said means including a driven gear fast with and rotatable with said film-feeding member, a manually rotatable driving gear having teeth more widely spaced than and engageable with the teeth of said driven gear to rotate the latter through a predetermined angular distance so as to cause said film-feeding member to feed the film through the distance of one frame; and a flexible driving cord between said manually-operable means and said spool for rotating the same, said driving cord tending to rotate said spool in a direction to maintain taut the length of film extending between said feeding member and said spool.

3. In a film viewer, the combination of: a casing having a pair of recesses providing spaced film receptacles, said casing having an aperture in its side through which light can enter and a lens in its opposite side in alignment with said aperture, the first of said receptacles being adapted to contain a coil of picture film; a spool in the second of said receptacles and provided with a first pulley; an intermittently rotatable film-feeding member engageable with said film for feeding the film from said first receptacle to said spool past said aperture; manually-operable means for intermittently rotating said feeding member, said means including a second pulley; and a flexible driving cord adapted to be arranged in crossed and uncrossed manner between said manually-operable means and said spool for rotating the same respectively for winding the film thereon and therefrom, said driving cord tending to rotate said spool in a direction to maintain taut the length of film extending between said feeding member and said spool.

4. In a film viewer, the combination of: a casing having a pair of recesses providing spaced film receptacles, said casing having an aperture in its side through which light can enter and a lens in its opposite side in alignment with said aperture, the first of said receptacles being adapted to contain a coil of picture film; a spool in the second of said receptacles and provided with a first pulley; an intermittently rotatable film-feeding member engageable with said film for feeding the film from said first receptacle to said spool past said aperture; manually-operable means for intermittently rotating said feeding member, said means including a second pulley; and a flexible driving cord extending around said first and second pulleys and crossed for normally rotating said spool in a direction to wind up said film, said driving cord being adapted to slip on said pulleys and tending to rotate said spool in a direction to maintain taut the length of film extending between said feeding member and said spool, said cord being adapted to extend around said first and second pulleys in uncrossed relation so as to rotate said spool in a direction, to unwind said film therefrom when the film is disengaged from said feeding member, and to cause the film to coil in said first receptacle.

5. In a film viewer, the combination of: a casing for containing a coil of film having longitudinally-spaced openings, said casing having an aperture in one side for admitting light; a lens disposed in the opposite side of said casing through which light passing through said aperture and projected through said film can be viewed; feeding means for intermittently feeding the film past said aperture, said feeding means including a rotatable cog-wheel having teeth engageable in successive openings of the film, and a driven gear integral with the cog-wheel; manually-operable means for intermittently rotating said cog-wheel with a step-by-step motion in one direction, said means including a driving gear having teeth more widely spaced than the teeth of said driven gear and engageable therewith to rotate said driven gear through a predetermined angular distance so as to couse said film-feeding member to feed the film through the distance of one frame; and detent means for preventing retrogressive movement of said wheel between intermittent rotations.

6. In a film viewer, the combination of: a casing for containing a coil of film having longitudinally-spaced openings, said casing having an aperture in one side for admitting light; a lens disposed in the opposite side of said casing through which light passing through said aperture and projected through said film can be viewed; and feeding means for intermittently feeding the film past said aperture, said feeding means including a rotatable cog-wheel having teeth engageable in successive openings of the film and provided with an integral gear, a manually-rotatable gear having widely spaced teeth each of which is adapted to engage a tooth of said integral gear to rotate the same through a predetermined angular distance so as to cause said wheel to feed the film through the distance of one frame, and a resilient detent engageable with a portion of said integral gear for preventing retrogressive movement of said wheel between intermittent rotations.

7. A viewer as defined in claim 6, and including a shutter means intermittently operated by the teeth of said manually-operable gear for disrupting the beam of light passing through said aperture, film, and lens during the feeding of said film.

8. The combination defined in claim 7, in which said shutter means includes a shaft rotatable in said casing and having a slotted shutter element adapted to be rotated to one position wherein its slot aligns with said aperture so as to permit passage of the beam of light to said lens and to a second position wherein its slot is out of alignment with said beam of light, spring means for normally maintaining said shutter element in said second position, and a pawl carried by said shaft and adapted to be engaged by and ride over successive teeth of said manually-operable gear to rotate said element to said first position, said pawl serving as a check to prevent reverse rotation of said manually-operable gear.

9. The combination defined in claim 8, in which said gears, pawl, detent means, and spring means are disposed in a hollow portion of said casing at one side thereof, and carried by a cover which closes said portion, the edges of said cover being engageable in grooves in the sides of said portion to retain the cover in place thereon.

10. The combination defined in claim 1, in which said casing has an open side through which the film may be inserted into and removed from said casing, and including a closure member for closing said open side, the edges of said member being engageable in grooves in said casing to releasably retain the member in place.

11. The combination defined in claim 1, in which said casing has spaced finger-pieces at the lens side thereof, one at each side of said axis adapted to be gripped by the fingers of the person operating the viewer so as to facilitate holding the viewer.

12. The combination defined in claim 1, in which said spool is detachably connected to a shaft rotatable in said casing, said shaft being adapted to be rotated by said driving connection.

FRANCIS T. COFFEY, Sr.

REFERENCES CITED

The following references are of record in the file of this patent:

UNITED STATES PATENTS

| Number | Name | Date |
|---|---|---|
| 1,131,033 | Blackman | Mar. 9, 1915 |
| 1,774,097 | Hauser et al. | Aug. 26, 1930 |
| 1,876,845 | Bowen et al. | Sept. 13, 1932 |
| 1,957,378 | Zimmerman | May 1, 1934 |
| 2,441,829 | Miller | May 18, 1948 |

FOREIGN PATENTS

| Number | Country | Date |
|---|---|---|
| 444,373 | Great Britain | Mar. 19, 1935 |
| 447,916 | Great Britain | May 27, 1936 |